(12) United States Patent
Liao

(10) Patent No.: US 7,076,837 B2
(45) Date of Patent: Jul. 18, 2006

(54) HINGE DEVICE FOR ELECTRONIC DISPLAY

(75) Inventor: Chih Cheng Liao, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 11 days.

(21) Appl. No.: 10/823,101

(22) Filed: Apr. 12, 2004

(65) Prior Publication Data

US 2004/0200036 A1    Oct. 14, 2004

(30) Foreign Application Priority Data

Apr. 11, 2003   (TW) ............................... 92205662 U

(51) Int. Cl.
*E05D 11/06* (2006.01)
*E05D 3/10* (2006.01)

(52) U.S. Cl. ........................... 16/371; 16/367; 16/342; 16/312

(58) Field of Classification Search .................. 16/334, 16/342, 337, 339, 340, 367, 242, 248, 239, 16/312–318; 248/917, 919, 922, 923; 361/680–683
See application file for complete search history.

(56) References Cited

U.S. PATENT DOCUMENTS

| | | | | |
|---|---|---|---|---|
| 1,374,437 A | * | 4/1921 | Coombs ....................... | 16/313 |
| 3,691,788 A | * | 9/1972 | Mazziotti ..................... | 464/139 |
| 3,858,274 A | * | 1/1975 | Burton et al. ................. | 16/312 |
| 4,391,020 A | * | 7/1983 | Hsu ............................. | 16/314 |
| 5,367,745 A | * | 11/1994 | Roloff ......................... | 16/312 |
| 5,412,842 A | * | 5/1995 | Riblett ........................ | 16/334 |
| 6,742,221 B1 | * | 6/2004 | Lu et al. ...................... | 16/367 |
| 6,845,546 B1 | * | 1/2005 | Lu et al. ...................... | 16/367 |
| 6,850,407 B1 | * | 2/2005 | Tanimoto et al. ............ | 361/681 |
| 6,883,206 B1 | * | 4/2005 | Yang et al. ................... | 16/337 |
| 6,884,861 B1 | * | 4/2005 | Keller et al. ................. | 526/285 |
| 2002/0109962 A1 | | 8/2002 | Tseng et al. | |
| 2004/0139579 A1 | * | 7/2004 | Su ............................... | 16/351 |
| 2004/0139581 A1 | * | 7/2004 | Tsai ............................. | 16/366 |
| 2004/0200038 A1 | * | 10/2004 | Kim ............................. | 16/367 |
| 2005/0055806 A1 | * | 3/2005 | Shiba .......................... | 16/341 |
| 2005/0076474 A1 | * | 4/2005 | Lu et al. ...................... | 16/280 |
| 2005/0091796 A1 | * | 5/2005 | Lu et al. ...................... | 16/337 |
| 2005/0125950 A1 | * | 6/2005 | Su ............................... | 16/320 |

FOREIGN PATENT DOCUMENTS

| | | | | |
|---|---|---|---|---|
| JP | 11257342 A | * | 9/1999 | |
| JP | 11272187 A | * | 10/1999 | |
| JP | 2004360758 A | * | 12/2004 | |

* cited by examiner

*Primary Examiner*—Chuck Y. Mah
(74) *Attorney, Agent, or Firm*—Wei Te Chung

(57) ABSTRACT

A hinge device for pivotally coupling a display to a base includes a seat for being secured with the base, a rotor, a pair of hinges, and at least one roller located on the rotor. The seat defines a hole, and a railway defined in an inner wall of the seat. The rotor includes a shaft pivotally received in the hole, and a pair of beams. Each hinge includes a first rotating member for being attached to the respective beam, and a second rotating member pivotally engaged with the first rotating member for being attached to the display. The roller is movably received in the railway. The railway defines at least two points located in two different planes perpendicular to an axial direction of the shaft. When the shaft of the rotor rotates, the roller moves along the railway to cause the rotor to move in said axial direction.

20 Claims, 4 Drawing Sheets

HINGE DEVICE FOR ELECTRONIC DISPLAY

BACKGROUND OF THE INVENTION

1. Field of the Invention

The present invention relates to a hinge device for pivotally coupling a display and a base of an electronic device, and more particularly to a hinge device which can adjust the vertical distance between the display and the base when the display is swiveled in directions parallel to the base.

2. Related Art

With the development of the 3C (Computer, Consumer electronic products, Communication) industry, users are paying more attention to flexibility and convenience of electronic devices such as notebook computers, mobile phones and electronic dictionaries. At present, each such electronic device usually utilizes a hinge device to pivotally couple a display and a base thereof.

A tilt/swivel hinge device has come to be used in this kind of electronic device. This type of hinge device can move the display relative to the base in up-and-down tilt directions about a horizontal axis, and in right-and-left swivel directions about a vertical axis. The U.S. Patent Publication No. 2002/0109962A1 discloses a flat panel display apparatus and a tilt/swivel mechanism therein which comprises a flat panel display, a computer, a swivel base, a yoke, a mounting base and two elastic members. The yoke is connected to an edge of the flat panel display. The swivel base is pivotally secured to the edge of the flat panel display with the yoke. The swivel base has a first cylinder; an outer surface of the first cylinder defines two parallel and opposite grooves. The mounting base is located on the computer, and has a second cylinder. A cable hole is defined in a center of the second cylinder to hold the mounting base, and two opposite mounting slots are located in the cable hole. Each elastic member has a projection that is held in a respective mounting slot. Each groove can hold the projection, and stop the swiveling action so that the swivel base swivels to a particular discrete orientation in the mounting base.

With this kind of hinge device, the display swivels freely in right-and-left direction relative to the base. However, because of tolerances as between the yoke and the swivel base, the vertical pivoting axis is not always normal to the base during swiveling. Thus, a bottom of the display may easily scratch or damage a keyboard and an upper surface of the base. If the angle of offset as between the actual axis and the predetermined axis is exceedingly large, the display may not be able to swivel freely in right-and-left directions relative to the base.

An improved hinge device which overcomes these problems is desired.

SUMMARY OF THE INVENTION

Accordingly, a main object of the present invention is to provide a hinge device for pivotally coupling a display to a base of an electronic device.

Another object of the present invention is to provide a hinge device which simultaneously adjusts a vertical distance between a display and a base of an electronic device when the display swivels in right-and-left directions relative to the base.

To achieve the above objects, a hinge device of the present invention for pivotally coupling a display to a base of an electronic device. The hinge device includes a seat securing in the base and a rotor attached to the display. The seat defines a center through hole therein and a railway in an inner wall of the seat. The rotor includes a shaft pivotally received in the center through hole of the seat and a pair of opposite beams connecting to the display. At least one socket is defined in an outer wall of the shaft. A roller is tightly held between the socket of the rotor and the railway of the seat. The roller moves along the railway when the rotor rotates in the seat. The display swivels in left-and-right direction relative to the base and alters the vertical distance from the base.

Other objects, advantages and novel features of the present invention will be drawn from the following detailed description of a preferred embodiments of the present invention with the attached drawings, in which:

BRIEF DESCRIPTION OF THE DRAWINGS

Referring to FIGS. 1 and 7, a hinge device in accordance with the present invention is for pivotably coupling a display 70 to a base 80 of an electronic device such as a notebook computer. The hinge device comprises a pair of first hinges 100 and a second hinge 200.

Figure 1:
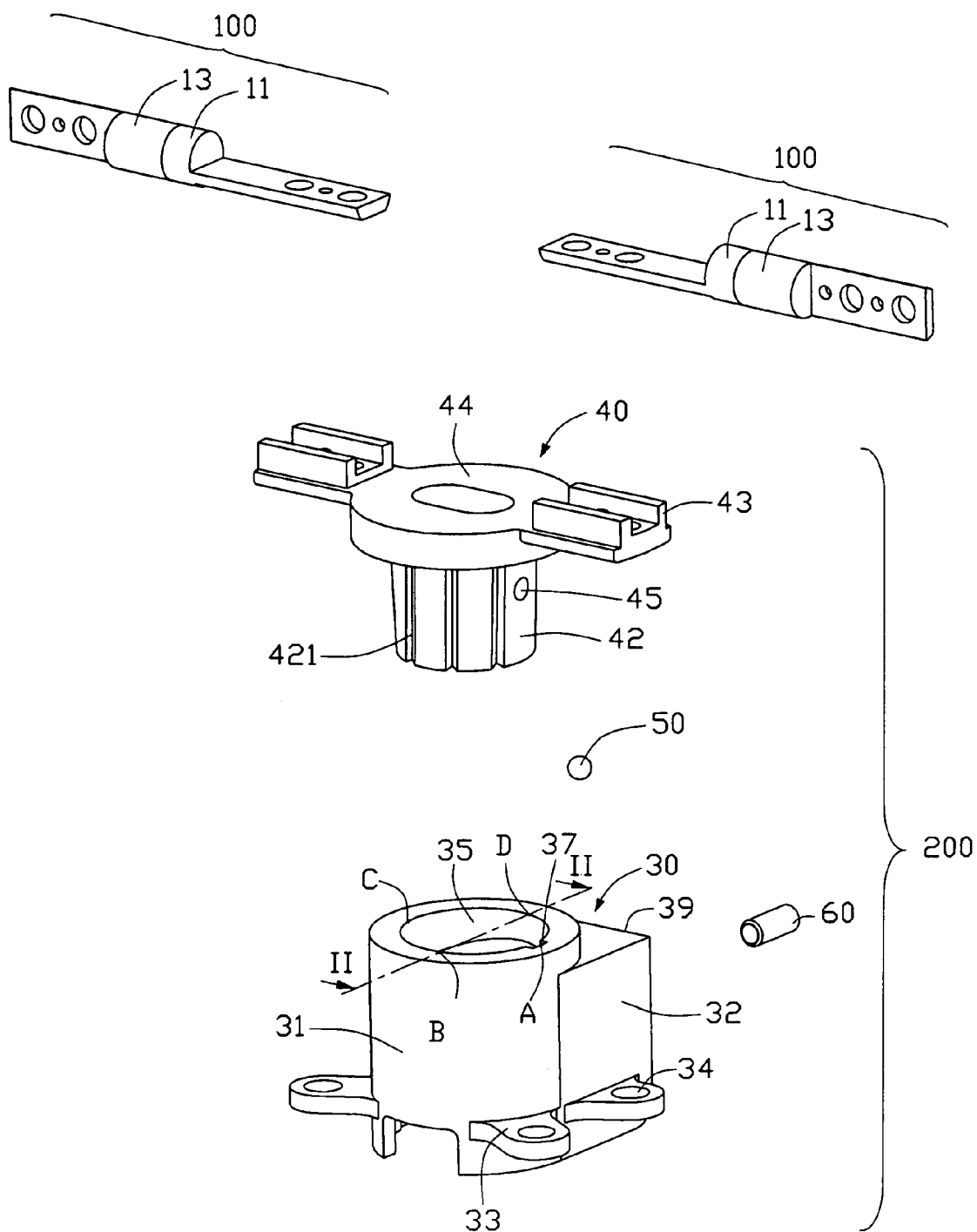
FIG. 1 is an exploded, isometric view of a hinge device in accordance with the present invention.

Each first hinge 100 comprises a first rotating member 11 and a second rotating member 13. The first rotating member 11 rotationally engages with the second rotating member 13. Each of the first and second rotating members 11, 13 comprises a connecting board (not labeled) extending from an end thereof. A plurality of securing holes (not labeled) is defined in each connecting board. Fasteners (not shown) are extended through the securing holes of the connecting board of the second rotating member 13 to attach the first hinge 100 to the display 70.

Figure 2:
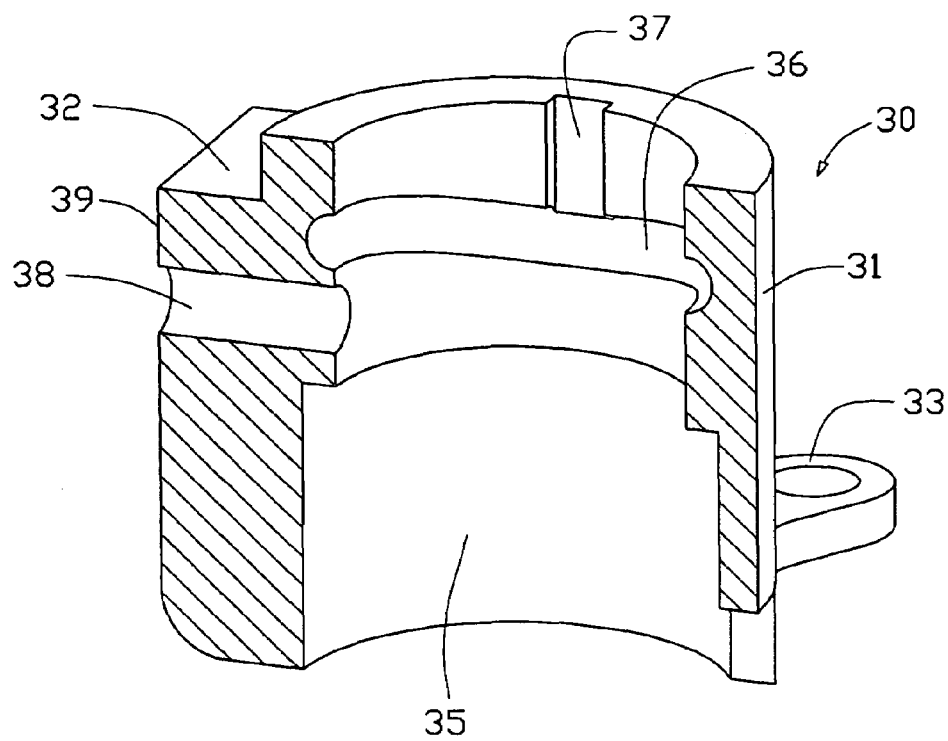
FIG. 2 is an enlarged, isometric cutaway view of a seat of the hinge device of FIG. 1, corresponding to line II—II thereof.
Figure 3:
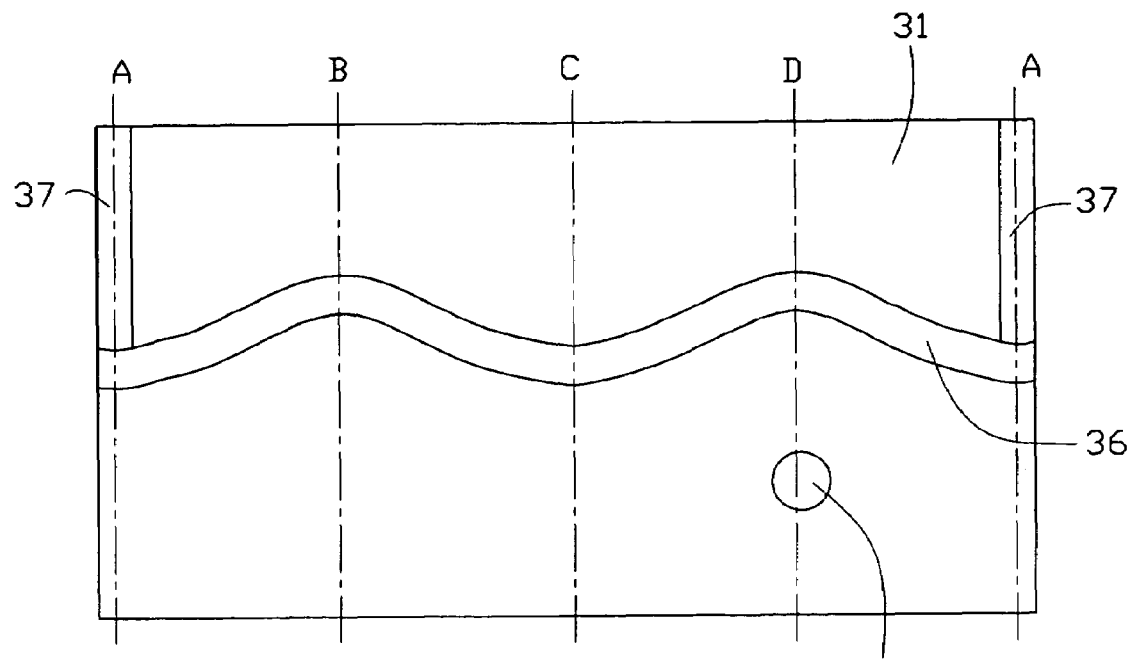
FIG. 3 is a schematic expanded view of an inside of the seat of FIG. 2, showing a railway thereof with exaggerated curvature.

Referring also to FIGS. 2 and 3, the second hinge 200 comprises a seat 30, a rotor 40, a roller 50 and a locator 60.

The seat 30 comprises a cylindrical body 31. A block 32 extends rearwardly from an outer circumferential surface of the cylindrical body 31. The block 32 forms a planar rear wall 39. A plurality of connecting tabs 33 extends outwardly from bottom portions of the cylindrical body 31 and the block 32. A through aperture 34 is defined in each connecting tab 33. The cylindrical body 31 defines a central through hole 35 therein. A railway 36 is defined in an inner wall of the cylindrical body 31. A path of the railway 36 is generally sinusoidal end traces two complete cycles. An imaginary line between crest points of the railway 36 corresponding to lines B and D is perpendicular to the rear wall 39 of the block 32. An imaginary line between through points of the railway 36 corresponding to lines A and C is parallel to the rear wall 39. A vertical guide channel 37 is defined in the inner wall of the cylindrical body 31 corresponding to line A, spanning from a top of the cylindrical body 31 to the railway 36. A threaded locating hole 38 is defined through the block 32 and the cylindrical body 31.

Figure 6:
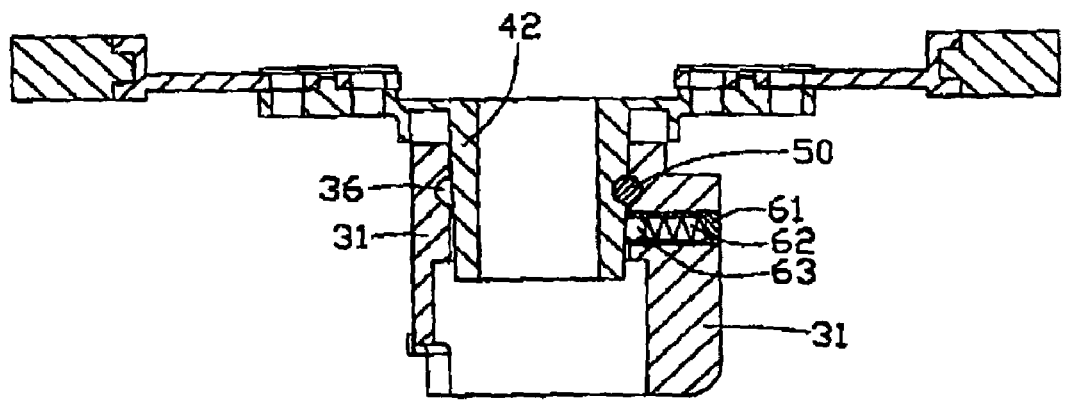
FIG. 6 is a cross-sectional view taken along line VI—VI of FIG. 5.
Figure 7:
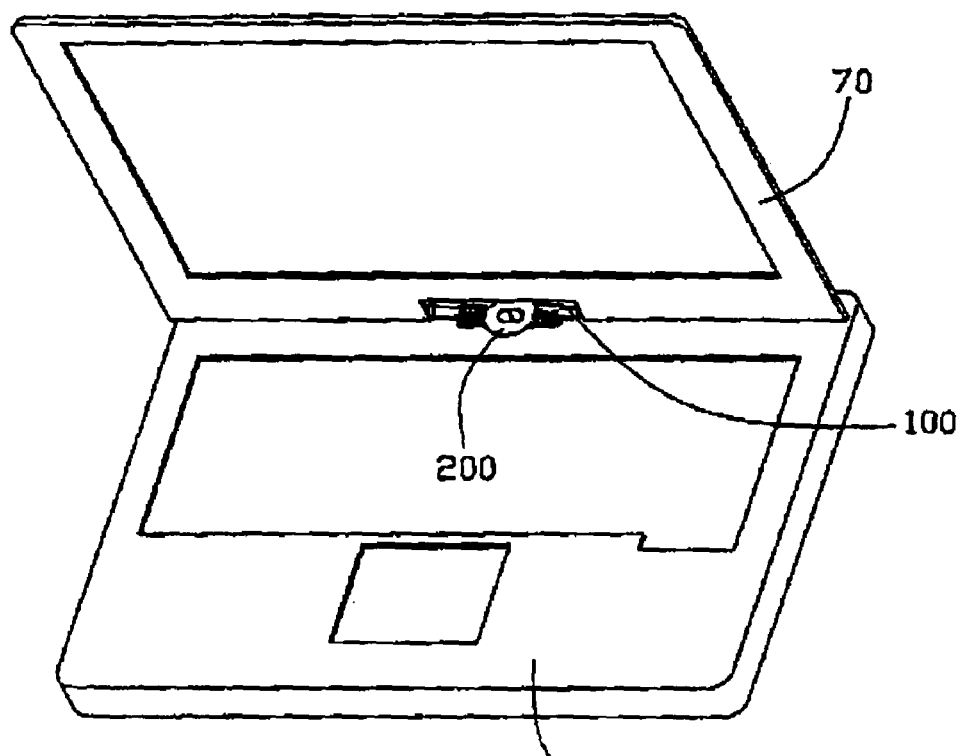
FIG. 7 is an isometric of a notebook computer employing the hinge device of FIG. 1.

Referring to FIG. 6, the locator 60 comprises a cup 61 having an outer thread, a spring 62, and a ball 63. The spring 62 abuts against an inside bottom of the cup 61. The ball 63 abuts against an outmost end of the spring 62.

Referring to FIGS. 1, 5, 6 and 7, in assembly, the seat 30 is arranged in the base 80, with the rear wall 39 of the block 32 facing rearward. Fasteners (not shown) are extended through the through apertures 34 of the seat 30 and engaged with the base 80, thereby securing the seat 30 in the base 80. The roller 50 is placed in the socket 45 of the rotor 40. The combined rotor 40 and roller 50 is attached to the seat 30, with the roller 50 sliding along the guide channel 37. The shaft 42 of the rotor 40 is pivotally received in the through hole 35 of the seat 30, and the roller 50 is tightly held between the socket 45 of the rotor 40 and the railway 36 of the seat 30. Fasteners (not shown) are extended through the securing holes of the second rotating members 13 to attach the first hinges 100 in the display 70. Fasteners (not shown) are extended through the securing hole of the first rotating members 11 and the securing holes of the beams 43 of the rotor 40 to attach the first hinges 100 to the second hinge 200. The locator 60 is threaded into the locating hole 38 of the seat 30. The locator 60 is used to locate the rotor 40 in discrete positions as the rotor 40 is rotated in the seat 30, with the ball 63 engaging in respective vertical flutes 421 of the rotor 40.

Figure 4:
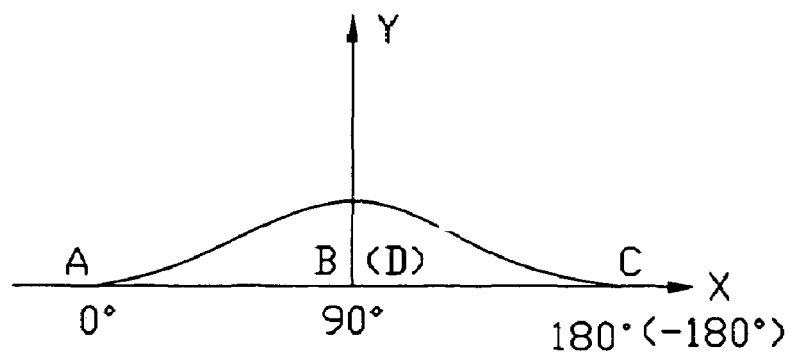
FIG. 4 is a graph showing a relationship between an angle of swiveling of a display of an electronic device employing the hinge device of FIG. 1 and a vertical distance between the display and a base of the electronic device (X: angle of swiveling; Y: vertical distance)
Figure 5:
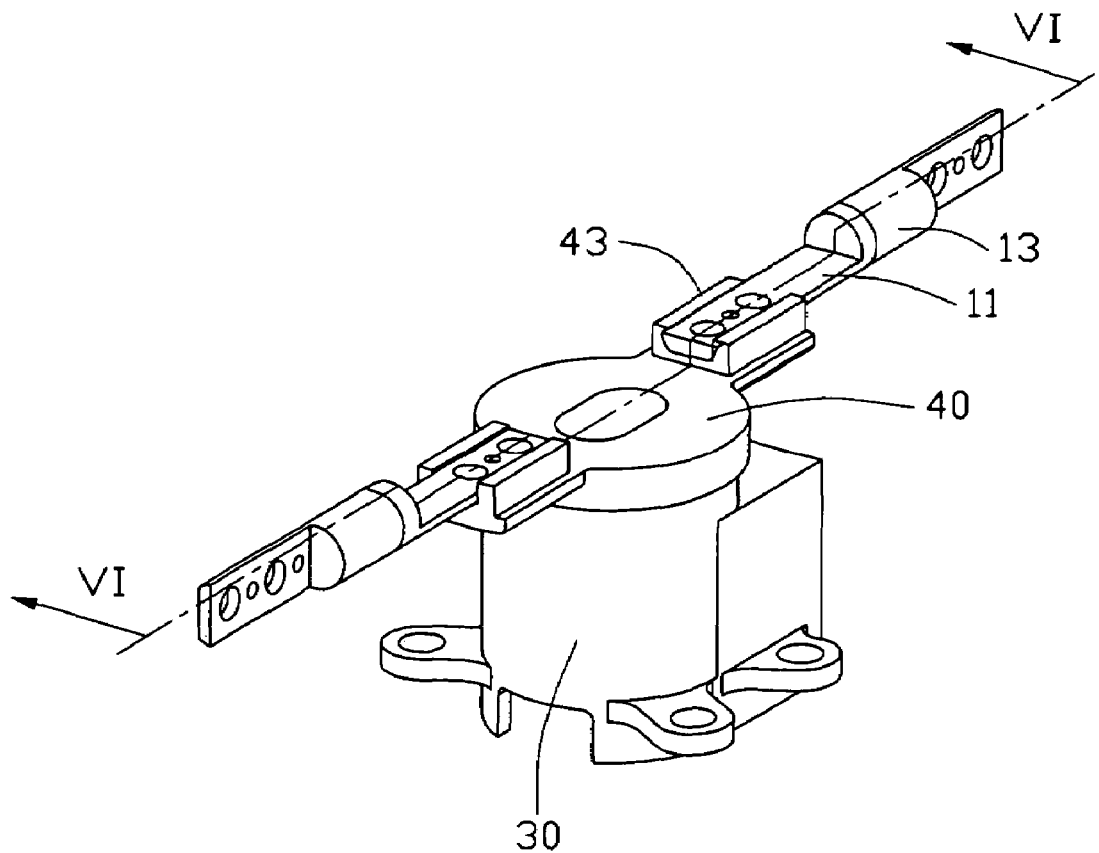
FIG. 5 is an assembled view of FIG. 1, but viewed from another aspect.

Referring also to FIG. 4, the display 70 can swivel in clockwise and counter-clockwise directions relative to the base 80, with the shaft 42 of the rotor 40 rotating in the through hole 35 of the sea 30. During such swiveling, the roller 50 moves along the railway 36. Thus, a height of the rotor 40 relative to the seat 30 changes, and a distance of the display 70 from the base 80 changes accordingly. That is, the distance between the display 70 and the base 80 progressively changes during swiveling according to the sinusoidal curve of the railway 36. For example, when the beams 43 of the rotor 40 are aligned with the imaginary line between the trough points corresponding to lines A and C, the distance between the rotor 40 and the seat 30 is a minimum distance. When the display 70 is then swiveled in either direction, the rotor 40 gradually rises relative to the seat 30. When the beams 43 are aligned with the imaginary line between the crest points corresponding to lines B and D, a distance between the rotor 40 and the seat 30 is a maximum distance. When the display 70 is further swiveled in the same direction, the rotor 40 gradually moves lower relative to the seat 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

The invention claimed is:

1. A hinge device for pivotally coupling a display to a base of an electronic device, the hinge device comprising:
   a seat for being secured with the base, the seat defining a hole therein, and an inner wall of the seat defining a railway therein;
   a rotor comprising a shaft pivotally received in the hole of the seat, and a pair of beams;
   a pair of hinges, each of the hinges comprising a first rotating member for being attached to a respective one of the beams of the rotor, and a second rotating member pivotally engaged wit the first rotating member for being attached to the display; and
   at least one roller located on the rotor and movably received in the railway of the seat;
   wherein the railway defines at least two points thereon located in two different planes perpendicular to an axial direction of the shaft, and when the shaft of the rotor rotates in the hole of the seat, the at least one roller moves along the railway to cause the rotor to move in said axial direction of the shaft.

2. The hinge device as described in claim 1, wherein the seat defines a locating hole therethrough, the locating hole engagingly receives a locator, the locator comprises a cup, a spring and a ball, one end of the spring abuts against an inside bottom of the cup, and another end of the spring abuts against the ball.

3. The hinge device as described in claim 2, wherein the locator is threadingly engaged in the locating hole.

4. The hinge device as described in claim 2, wherein an outer wall of the shaft of the rotor defines a plurality of parallel flutes parallel to said axial direction of the shaft, and the ball of the locator engages in respective flutes to locate the rotor in discrete positions as the rotor is rotated in the seat.

5. The hinge device as described in claim 4, wherein the shaft defines at least one socket accommodating the at least one roller.

6. The hinge device as described in claim 1, wherein the railway has a generally sinusoidal path and traces two complete cycles.

7. The hinge device as described in claim 6, wherein the seat further defines a vertical guide channel in an inner wall thereof in communication with the railway for facilitating entry of the at least one roller into the railway.

8. A hinge device assembly comprising:
   a base;
   a display; and
   a hinge device coupling the display to the base, the hinge device comprising:
      a pair of first hinges each comprising a first rotating member and a second rotating member pivotally engaging with the first rotating member around a first axis, the second rotating member being secured to the display; and
      a second hinge comprising a seat engaged with the base and a rotor engaged with the first rotating member, the seat pivotally engaged with the rotor around a second axis, the seat defining a railway in an inner wall thereof, the rotor defines at least one socket in an outer wall thereof accommodating at least one roller, the at least one roller being tightly and movably held between the socket and the railway;
   wherein the display is rotatable around both said first axis and said second axis, and when the display rotates around said second axis, the display is driven to move along said second axis due to a movement of the rotor together with a movement of the at least one roller alone the railway.

9. The hinge device assembly as described in claim 8, wherein the seat defines a central through hole therein and the rotor comprises a shaft rotatably received in the through hole.

10. The hinge device assembly as described in claim 9, wherein the seat comprises a block extending from an outer circumferential wall thereof a locating hole is defined through the seat and the block, and a locator is received in the locating hole.

11. The hinge device assembly as described in claim 10, wherein the locator comprises a cup, a spring and a ball, the spring abuts against an inside bottom of the cup, the ball abuts against an outmost end of spring, and the shaft of rotor defines a plurality of vertical parallel flutes in an outer wall thereof, the ball of the locator engaging in respective flutes to locate the rotor during rotation of the rotor in the seat.

12. The hinge device assembly as described in claim 11, wherein the locating hole is threaded, and the cup has an outer thread.

13. The hinge device assembly as described in claim 8, wherein the railway has a generally sinusoidal path and traces two complete cycles.

14. The binge device assembly as described in claim 8, wherein a vertical guide channel is defined in the inner wall of the seat in communication with the railway.

15. A hinge device assembly comprising:
a base;
a display pivotably coupled to the base;
a seat coupled to one of the base and the display, the seat defining
a first engagement device defining a vertical axis and a first guiding device; and
a rotor coupled to the other of the base and the display, the rotor comprising a second engagement device defined thereon and engaged with said first engagement device, and a second guiding device guidably engaged with the first guiding device; wherein
the rotor is rotatable relative to the seat about said vertical axis under a condition that during rotation said rotor is forced to move up and down along said vertical axis due to engagement between the first and second guiding devices, one of the first guiding device and the second guiding device defines a guiding path thereon, at least two points on said guiding path projecting on said vertical axis to define two different points so as not to have the base and the display interfere with each other, and one of said first engagement device and said second engagement device defines a plurality of flutes thereat surrounding said vertical axis to position the other of said first engagement device and said second engagement device in a selected one of the flutes.

16. The hinge device assembly as described in claim 15, wherein the rotor reaches a greatest height when the rotor rotates 90 degrees from a lowest point of the guiding path.

17. The hinge device assembly as described in claim 16, wherein a flattened shape of the guiding path is sinusoidal and traces two cycles.

18. The hinge device assembly as described in claim 15, wherein one of the seat and the rotor defines a guiding channel parallel to said vertical axis, and the guiding channel communicates with the guiding path for positioning of a roller into the guiding path via the guiding channel.

19. The hinge device assembly as described in claim 15, wherein one of said first engagement device and said second engagement device comprises a ball and a spring extending from one side of the ball, the ball thereby resiliently engaging with the other of said first engagement device and said second engagement device.

20. The hinge device assembly as described in claim 15, wherein one of the seat and the rotor is coupled to a respective one of the base and the display via a hinge, and a portion of the hinge is rotatable with respect to another portion of the hinge around a horizontal axis perpendicular to said vertical axis.

* * * * *